UNITED STATES PATENT OFFICE.

HERBERT C. DORR, OF SAN FRANCISCO, CALIFORNIA.

COMPOUND FOR PRESERVING WOOD.

SPECIFICATION forming part of Letters Patent No. 293,955, dated February 19, 1884.

Application filed June 30, 1883. (No specimens.)

*To all whom it may concern:*

Be it known that I, HERBERT C. DORR, a citzen of the United States, residing at San Francisco, in the county of San Francisco and State of California, have invented a new and useful Compound for the Preservation of Wooden Piles.

The object of my invention is to provide a composition from the distillation of coal-tar to be applied to wooden piles or other structures, and more especially to those that are used in salt-water, for the better preservation of such structures, as well as to protect them from the ravage of worms or insects, to which they are ever liable, than any composition of matter heretofore used for the same purpose; and hence my invention therein consists in the peculiar compound composed of the ingredients in about the proportions and applied in the manner hereinafter explained.

I take of a product obtained from the distillation of coal-tar, known in the arts as the "oil of tar" or "dead-oil," fifty gallons, and mix with it twenty-five pounds of finely-pulverized sulphur and twenty-five pounds of paraffine, when the whole is heated, in a suitable vessel, to a temperature of 270° Fahrenheit, or until the sulphur contained in the compound has become liquefied. I then allow the temperature of the compound to become lowered to, say, about 130° Fahrenheit, or so as not to char the wood by excess of heat, when the compound is in condition for use. The compound is then conducted to a suitable tank, which should be metal-lined if made of wood. The wood is then placed in the tank, preferably in a vertical position, and allowed to remain immersed for a length of time varying from two to four weeks, according to the amount of moisture to be expelled from the wood. The action of the compound has a tendency to expel the moisture from the wood and supply its place, while the water, being lighter than the combined ingredients of the compound, rises to the top, and interferes in no way with the process of saturation.

A moderate heat may be applied to the contents of the tank, and will prevent the compound from becoming cooled, and materially lessen the time employed in the saturation of the wood.

My compound thus applied will be found of great utility, and will accomplish its purpose at less expense and more conveniently than those hitherto used. The compound, being heavier than water, is of great advantage in its application over creosote, which has been heretofore most generally used, since the water rises to the surface, allowing the compound to thoroughly impregnate the wood, which is not the case when creosote is used, since the water sinks to the bottom of the tank and prevents the wood surrounded by it from being acted upon by the oil, while the sulphur and paraffine in my compound acts as a vehicle to convey and fix the oil within the fiber of the wood to be treated, it is not corrosive in its action upon the fibers of the wood, and will prevent the ravages of marine worms and other insects.

What I claim, and desire to secure by Letters Patent, is—

The herein-described compound for preserving wood, the same consisting of the oil of tar, fifty gallons; sulphur, twenty-five pounds; and paraffine, twenty-five pounds, as specified.

In testimony that I claim the foregoing I have hereunto set my hand and seal.

HERBERT C. DORR. [L. S.]

Witnesses:
 C. W. M. SMITH,
 W. P. COLEMAN.